United States Patent
Chartier et al.

(10) Patent No.: US 10,053,780 B2
(45) Date of Patent: Aug. 21, 2018

(54) METHOD FOR DEPOSITING AN ANTI-CORROSION COATING

(71) Applicants: L'Air Liquide, Societe Anonyme pour l'Etude et l'Exploitation des Procedes Georges Claude, Paris (FR); CENTRE NATIONAL DE LA RECHERCHE SCIENTIFIQUE, Paris (FR); UNIVERSITE DE LIMOGES, Limoges (FR); UNIVERSITE DE LORRAINE, Nancy (FR)

(72) Inventors: Thierry Chartier, Feytiat (FR); Pascal Del-Gallo, Dourdan (FR); Sebastien Doublet, Massy (FR); Thierry Mazet, Nancy (FR); Laurent Prost, Gif sur Yvette (FR); Nicolas Ramenatte, Pulnoy (FR); Fabrice Rossignol, Verneuil sur Vienne (FR); Michel Vilasi, Bouxieres aux Dames (FR)

(73) Assignees: L'Air Liquide, Société Anonyme pour l'Etude et l'Exploitation des Procédés Georges Claude, Paris (FR); Centre National de la Recherche Scientifique, Paris (FR); Université de Lorraine, Nancy (FR); Université de Limoges, Limoges (FR)

( * ) Notice: Subject to any disclaimer, the term of this patent is extended or adjusted under 35 U.S.C. 154(b) by 27 days.

(21) Appl. No.: 15/024,582

(22) PCT Filed: Sep. 17, 2014

(86) PCT No.: PCT/FR2014/052310
§ 371 (c)(1),
(2) Date: Mar. 24, 2016

(87) PCT Pub. No.: WO2015/044559
PCT Pub. Date: Apr. 2, 2015

(65) Prior Publication Data
US 2016/0237574 A1    Aug. 18, 2016

(30) Foreign Application Priority Data

Sep. 24, 2013    (FR) ..................................... 13 59156

(51) Int. Cl.
*C23C 28/00*    (2006.01)
*B01J 19/24*    (2006.01)
(Continued)

(52) U.S. Cl.
CPC .......... *C23C 28/30* (2013.01); *B01J 19/0093* (2013.01); *B01J 19/02* (2013.01); *B01J 19/249* (2013.01);
(Continued)

(58) Field of Classification Search
CPC ............ C23C 10/30; C23C 28/30; B05D 3/00
See application file for complete search history.

(56) References Cited

U.S. PATENT DOCUMENTS

| | | | | |
|---|---|---|---|---|
| 4,671,351 A * | 6/1987 | Rappe | .................... | C02F 11/08 165/133 |
| 6,413,582 B1 * | 7/2002 | Park | ........................ | C23C 10/18 427/235 |

(Continued)

FOREIGN PATENT DOCUMENTS

| EP | 1 065 296 | 1/2001 |
|---|---|---|
| EP | 1 091 021 | 4/2001 |

(Continued)

OTHER PUBLICATIONS

International Search Report and Written Opinion for PCT/FR2014/052310, dated Jan. 20, 2015.
(Continued)

*Primary Examiner* — Nathan H Empie
(74) *Attorney, Agent, or Firm* — Elwood L. Haynes

(57) ABSTRACT

Process for depositing a corrosion-protection coating on at least one portion of the surfaces of a metallic substrate having at least one cavity with an equivalent diameter $e_{mm}<2$ mm and a length/width ratio of greater than 150, using an aqueous suspension comprising powder of the metal to be deposited on the substrate combined with an agent for protecting the surface of the metal powder, a diluent, and at least one additive, the particles of the suspension each having an equivalent diameter d such that $d \leq e_{mm}/10$.

9 Claims, 3 Drawing Sheets

(51) Int. Cl.

| | | |
|---|---|---|
| *C23C 10/20* | (2006.01) | |
| *B01J 19/00* | (2006.01) | |
| *B01J 19/02* | (2006.01) | |
| *F28F 19/02* | (2006.01) | |
| *B05D 1/02* | (2006.01) | |
| *C23C 2/00* | (2006.01) | |
| *F28D 9/00* | (2006.01) | |
| *F28D 21/00* | (2006.01) | |

(52) U.S. Cl.
CPC .................. *B05D 1/02* (2013.01); *C23C 2/00* (2013.01); *C23C 10/20* (2013.01); *F28F 19/02* (2013.01); *B01J 2219/00842* (2013.01); *B01J 2219/0236* (2013.01); *F28D 9/0075* (2013.01); *F28D 2021/0022* (2013.01)

(56) References Cited

U.S. PATENT DOCUMENTS

| | | | |
|---|---|---|---|
| 6,887,519 | B1 | 5/2005 | Pillhoeffer et al. |
| 2009/0126833 | A1* | 5/2009 | Cavanaugh ............ C23C 10/20 148/248 |

FOREIGN PATENT DOCUMENTS

| | | |
|---|---|---|
| EP | 1 361 338 | 11/2003 |
| EP | 1 591 552 | 11/2005 |
| EP | 1 801 353 | 6/2007 |
| EP | 2 172 579 | 4/2010 |
| WO | WO 2005 094982 | 10/2005 |
| WO | WO 2007 047373 | 4/2007 |

OTHER PUBLICATIONS

French Search Report and Written Opinion for FR 1 359 156, dated Jul. 21, 2014.

* cited by examiner

XY : 2967 µm × 481.3 µm
X : 370.8 µm/div, Y : 60.16 µm/div
Z : 104 µm
Z : 26.6 µm/div

METHOD FOR DEPOSITING AN ANTI-CORROSION COATING

CROSS-REFERENCE TO RELATED APPLICATIONS

This application is a § 371 of International PCT Application PCT/FR2014/052310, filed Sep. 17, 2014, which claims § 119(a) foreign priority to French patent application FR1359156, filed Sep. 24, 2013.

BACKGROUND

Field of the Invention

The present invention relates to the production of a corrosion-protection coating on a substrate that has cavities.

Related Art

In the context of intensification of the industrial processes used by the petroleum and chemical industries, the engineering departments concerned seek to improve the efficiency of the units that they design. So as to increase the efficiency, the approach followed during the development of new production units is the replacement, when this is possible, of the exchangers and reactors by devices of structured exchanger or exchanger-reactor type, enabling a great improvement in the yield of the unit. These exchangers or exchanger-reactors make it possible to have: (1) much more effective mass and heat transfers due to their high volume to surface area ratio, (2) a good thermal and structural stability and (3) a finer control of the operating conditions of the process leading to a higher production yield. These devices are usually formed of assembled grooved plates that form millimeter-sized channels.

When this technology is used in hydrocarbon cracking or reforming processes such as for example the steam methane reforming process used for the industrial production of syngas, the walls of the channels of the exchangers or exchanger-reactors must be covered by a protective coating so as to block the catastrophic effects of the high carbon activity that prevails within these processes. These conditions are behind the "metal dusting" phenomena, which are characterized by a disintegration of the alloys into particles of metal and of graphite, thus leading to the degradation of these exchangers or exchanger-reactors if they are not protected.

The protective coatings used may be based on aluminum or on chromium so as to develop protective stable oxide layers of $\alpha$-$Al_2O_3$ or $Cr_2O_3$ type. In general, aluminum or chromium is deposited in the gas phase, which operation is also referred to as gas aluminizing or chromizing. The oxide of aluminum or of chromium is then obtained either by a specific oxidation step in a furnace under controlled or uncontrolled partial pressure of oxygen, or by directly using the exchanger or exchanger-reactor in an oxidizing atmosphere.

The vapor deposition techniques use a gaseous precursor of the coating to be produced. This precursor may be produced in direct proximity to the surface to be coated (pack cementation) or be transported via a gas to the surface to be coated (out of pack, CVD using a gas cylinder or mixture, etc.). The main difficulties encountered for pack cementation are linked to the filling of parts that have a complex geometry or very small dimensions (several mm) with the cement powder (precursor mixture of the coating). The main limitations of techniques that use gaseous precursors relate to the rapid depletion of reactive species from the gaseous mixture leading to heterogeneities of chemical composition and/or of thickness of the coating. It is very difficult to obtain a uniform coating over great lengths or on surfaces that are difficult to access.

SUMMARY OF THE INVENTION

From here, one problem that is faced is to provide an improved process for producing a uniform coating on surfaces that are difficult to access, i.e. mainly on substrates having at least one cavity with a characteristic size of the order of a millimeter and high length/width ratios.

One solution of the present invention is a process for depositing a corrosion-protection coating on at least one portion of the surfaces of a metallic substrate having at least one cavity with an equivalent diameter $e_{mm}$<2 mm, preferably less than 1 mm, and a length/width ratio of greater than 150, preferably greater than 300, using an aqueous suspension comprising powder of the metal to be deposited on the substrate combined with a protective agent, a diluent, and at least one additive, the particles of the suspension each having an equivalent diameter d such that $d \leq e_{mm}/10$.

For a further understanding of the nature and objects for the present invention, reference should be made to the detailed description, taken in conjunction with the accompanying drawing, in which like elements are given the same or analogous reference numbers and wherein:

DETAILED DESCRIPTION OF THE INVENTION

Figure 1:
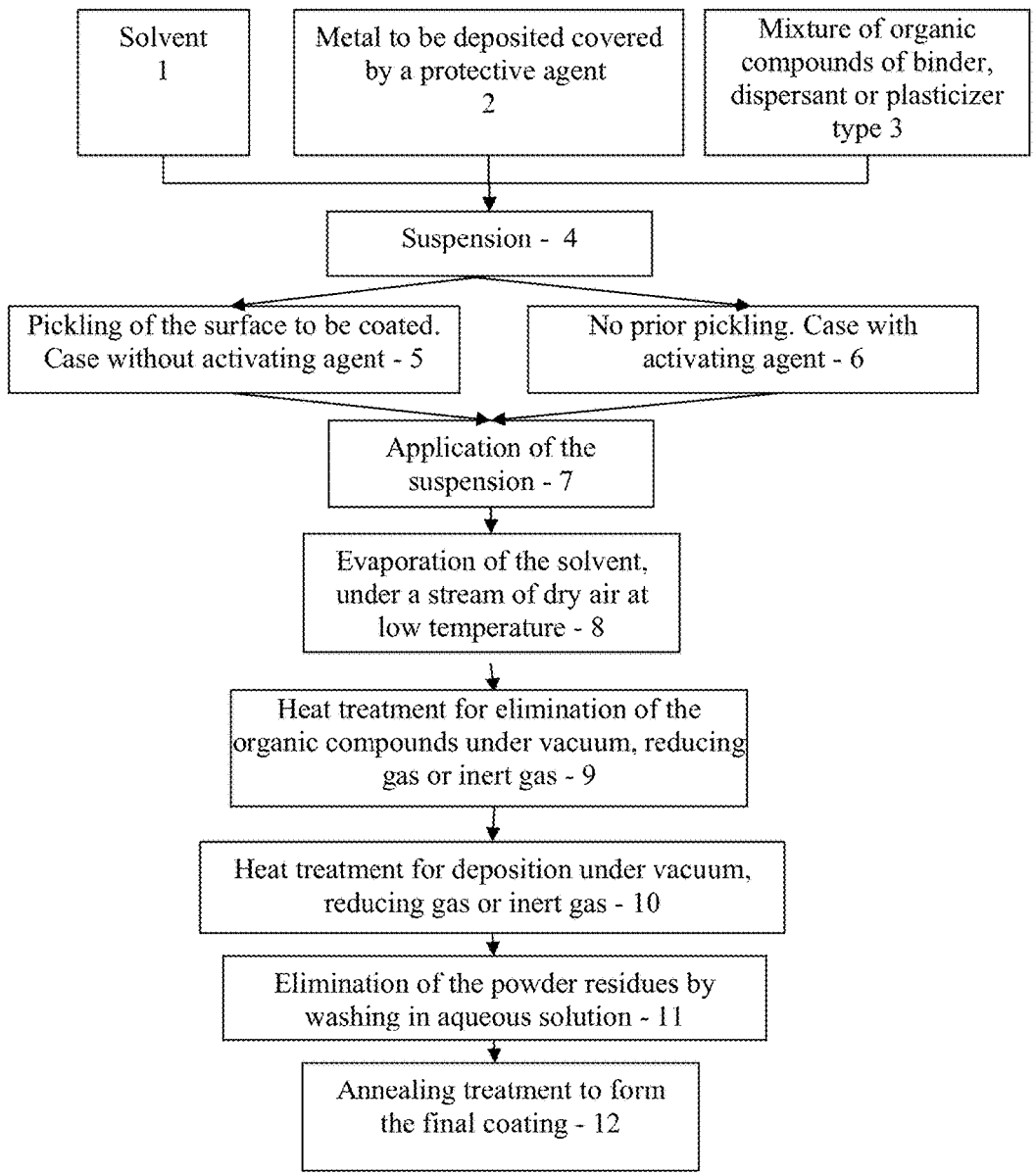
FIG. 1 is a flow diagram of the process of the invention.

The additive may be selected from a binder, a dispersant, a complexing agent, a wetting agent or a plasticizer. The additive makes it possible to promote the wetting of the surface to be coated.

It should be noted that the aqueous suspension may also comprise an activating agent.

Preferably, the metal to be deposited is aluminum.

In other words, the aqueous suspension as described above may be used for the production of a corrosion-protection coating.

The use of a suspension in the aqueous phase makes it possible to distribute the precursors of the coating, uniformly and with a degree of coverage of between 90% and 100%, and preferably greater than 95%, even over surfaces that are difficult access such as defined above.

The suspension used within the context of the invention has characteristics similar to a paint.

Preferably, the process according to the invention comprises the following successive steps:

a) the aqueous suspension comprising powder of the metal to be deposited on the substrate combined with a protective agent, a diluent, and at least one additive that makes it possible to promote the wetting of the surface to be coated and to control the thickness deposited is prepared, the particles of the suspension each having an equivalent diameter d such that $d \leq e_{mm}/10$;

b) the aqueous suspension prepared in step a) is applied to at least one portion of the surfaces of the cavities of the metallic substrate;

c) the substrate-suspension assembly is heated at a temperature below 150° C. so as to eliminate the aqueous solvent;

d) the substrate-suspension assembly is heated at a temperature between 400° C. and 500° C. for 1 to 10 hours under an inert or reducing gas or under vacuum so as to eliminate the organic compounds;

e) a diffusion heat treatment of the aluminum toward the substrate is carried out at a temperature between 500° C. and 700° C. for 1 to 10 hours under an inert or reducing gas or under vacuum;

f) the powder residues are eliminated from the coated substrate, g) the coated substrate is heated at a temperature between 900 and 1100° C. for 1 to 5 hours, and h) a substrate having cavities coated with a corrosion-protection coating is recovered.

Step g) makes it possible to react the constituent elements of the coating with the substrate to be protected and form the final coating.

Moreover, depending on the case, the process according to the invention may have one or more of the following characteristics:

said process successively comprises, between steps a) and b), a first step of cleaning the substrate with at least one aqueous solution, a second step during which the substrate is subjected to ultrasonic waves and a third step of drying the substrate under a stream of dry air;

the suspension comprises an activating agent and said process comprises, between step a) and the first cleaning step, a step of pickling the surfaces of the substrate to be coated;

step b) of applying the aqueous solution is carried out: by immersing the substrate in the aqueous solution, by injecting the aqueous suspension onto the substrate, or by brush application of the aqueous solution onto the substrate;

during step c) dry air is introduced inside the cavities of the substrate;

step f) of eliminating the powder residues is carried out by washing with aqueous solutions;

the substrate is a metallic exchanger.

The aqueous-phase suspension used within the context of the present invention has a simplified formulation and can be easily industrialized whereby:

water is the solvent used and is therefore easily implemented on the industrial scale, the reactants used are in accordance with the REACH regulation (EC 1907/2006), the use of additives is limited in number, the use of activating agent is not necessarily required.

The invention will be described in greater detail with the aid of the diagram from FIG. 2.

The first step of the process is the preparation of a suspension 4 of the powders used for the production of the coating. The metal powders to be deposited covered by a protective agent 2, are firstly ground in order to obtain a particle size distribution suitable for the geometry of the substrate to be coated. Use will preferably be made of powders having a mean diameter 10 times smaller than the size of the mean diameter of the cavities. Furthermore, if the diluent is also in powder form, its mean diameter should be around 100 times smaller than that of the metal powders. These powders must be dispersed homogenously in the solvent 1, i.e. in water. The presence of agglomerates may lead to a blockage of the inlet of the cavity to be coated. The main difficulty consists in dispersing powders of different natures within one and the same suspension. This is why organic compounds 3 (of binder, dispersant, complexing agent, wetting agent or plasticizer, etc. type) must be added to the suspension 4 and also in order to promote the wetting on the surface to be coated and to control the thickness deposited. The characteristics of the suspension must also be suitable for the chosen application technique (brush, roller, spray gun, immersion, etc.).

Depending on whether or not an activating agent is applied (5 or 6) to the suspension, a pickling of the substrates to be coated will be carried out before deposition. In all cases, the surfaces to be coated are cleaned with aqueous solutions, then they are subjected to ultrasonic waves for 15 min and finally they are dried under a stream of dry air.

The suspension may be applied 7 by various techniques, leading to the deposition of a uniform film on the exposed surfaces: 1) by immersing the substrate in the suspension—very simple technique but the deposition will be carried out on the inside and on the outside of the substrate, or 2) by injecting the suspension, or 3) by brush application. The zones that should not be covered may be protected by a mask which will be removed before or during the heat treatment for depositing the constituent compound(s) of the coating.

Following the application of the suspension, the solvent and the organic compounds used for suspending the powders may be eliminated.

Firstly, the aqueous solvent could be eliminated 8 at low temperature (maximum 150° C.). In order to facilitate the elimination of the solvent, a stream of dry air may be introduced inside the substrate. During this step, the critical point is not to degrade the deposit.

Secondly, a heat treatment 9 is carried out in order to eliminate the organic compounds. It is carried out at a temperature between 400° C. and 500° C. for 1 to 10 hours, depending on the organic compounds used. The heat treatment must be carried out under an inert or reducing gas, or under vacuum.

Next, a diffusion heat treatment 10 consists in reacting the deposit obtained previously with the surfaces of the substrate to be coated, resulting in the diffusion of the metal that it contains into the metallic part and thus in the growth at the surface of a coating enriched in this metal. This treatment will be carried out at a temperature between 500° C. and 700° C. for 1 to 10 hours. It must be carried out under an inert or reducing gas, or under vacuum.

After depositing the constituent elements of the coating, the powder residues, formed by the diluents and optionally activating agents must be eliminated 11. Several techniques may be used such as washing with aqueous solutions.

Finally, a final heat treatment 12 may be carried out in order to react the constituent elements of the coating with the alloy to be protected and form the final coating. This treatment will be carried out at 900-1100° C. for 1 to 5 hours.

Another subject of the present invention is a metallic heat exchanger or heat exchanger-reactor comprising channels having a corrosion-protection coating obtained by the process according to the invention, the channels having a degree of coverage of greater than 90%, preferably greater than 95%; and preferably the thickness of the coating layer is between 50 μm and 100 μm.

It should be noted that said exchanger or exchanger-reactor according to the invention may be used for the production of syngas, i.e. a mixture of hydrogen and carbon monoxide.

Example

A suspension was produced from the following ingredients: 10 g of water, 20.12 g of 44 µm aluminum powder, 5.37 g of 0.3 µm alumina powder, 0.02 g of oleic acid in 45 g of ethanol, 1.2 ml of polyvinyl alcohol, 0.011 g of disodium 4,5-dihydroxybenzene-1,3-disulphonate (Tiron C), and 0.2 ml of siloxane (BYK 348).

The aqueous-base suspension requires few means. It is synthesized in a container surmounted by a stirrer. This preparation comprises two steps: the first consists in protecting the surface of the aluminum powder and the second consists in producing the suspension.

Firstly, the oleic acid is dissolved in ethanol, then the aluminum powder is added and the mixture is stirred for 2 h. The ethanol is then evaporated. Secondly, the Tiron C is introduced into water and then the alumina powder is added, the suspension is then stirred by means of a sonotrode with an amplitude of 40% for 10 seconds. The BYK 348 is introduced next, then the pre-protected aluminum powder is added. The mixture is stirred for 10 min, at the end of which the polyvinyl alcohol is added. The suspension continues to be stirred.

The suspension was then applied by immersing parts with dimensions of 10×30×2 mm made of Ni—Fe—Cr alloy. The surfaces to be coated were cleaned with hydrochloric acid containing a corrosion inhibitor (HMT), then rinsed successively with water and with ethanol in an ultrasound bath for 15 min. Finally, they are dried under a stream of dry air.

Figure 3:
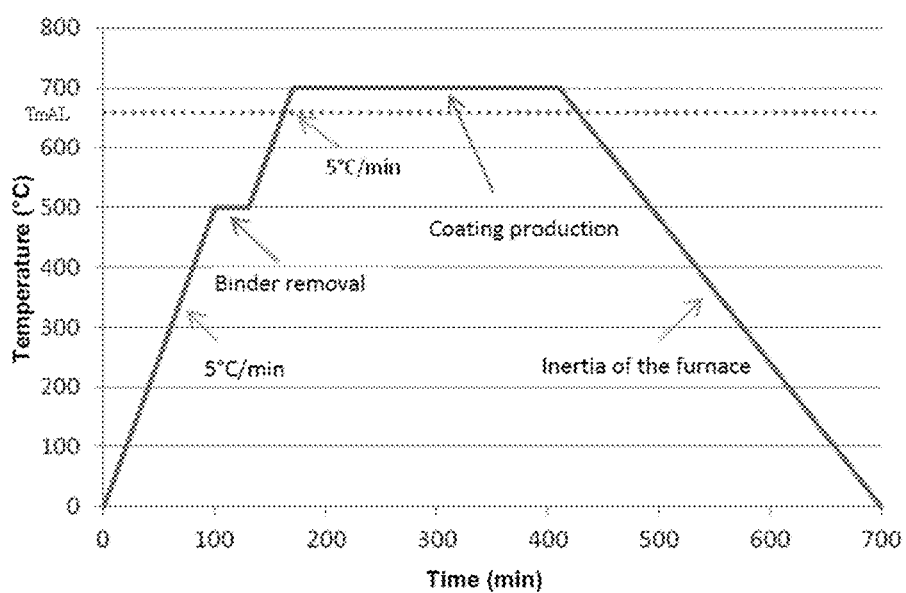
FIG. 3 is a graph of the temperature holds and ramps during the vacuum furnace heat treatment in the Example.

The deposition of the suspension is carried out in two successive steps: (1) immersing the parts in the suspension at ambient temperature, (2) steady withdrawal at constant speed of 17 mm/s. The thickness of deposit obtained is around 100 µm. The latter was monitored by optical profilometry over several control samples, as illustrated in FIG. 3 (Evaluation of the thickness of the deposit by profilometry).

Note that this process is also applicable to a process for injection into parts having cavities, by replacing step (1) with a step of complete injection of the part to be coated.

Figure 2:
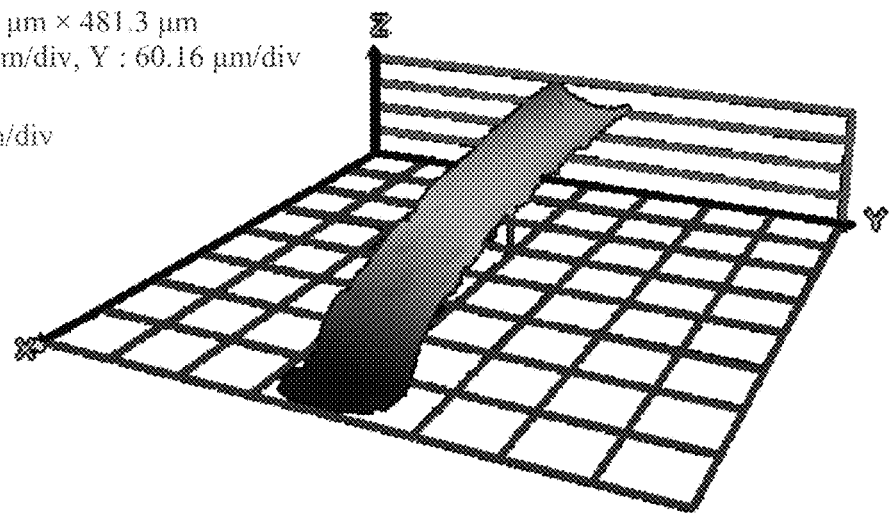
FIG. 2 is an optical profilometry graph of the thickness of the suspension deposited in the Example.
Figure 4:
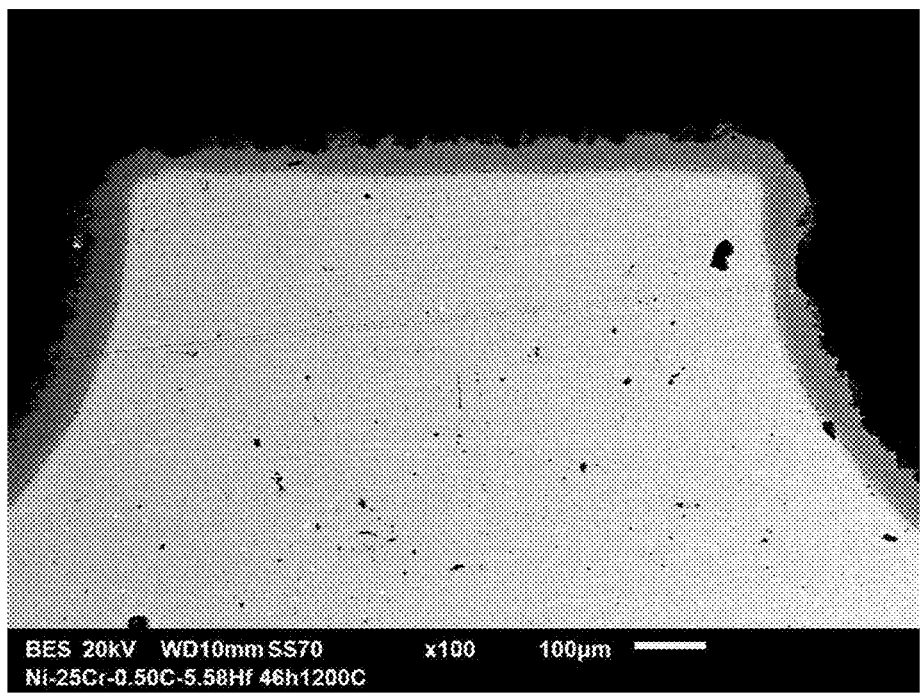
FIG. 4 is a cross-sectional photomicrograph of a coating produced in the Example by deposition at 700° C. and annealing at 980° C.

Next, the parts having the deposit were placed in a furnace under vacuum where the heat treatments corresponding to steps 8, 9 and 10 mentioned in FIG. 2 were able to be carried out. FIG. 4 (Summary of the various temperature holds and ramps) summarizes the various temperature holds and the duration thereof.

The powder residues, formed by the dispersants and activating agents, were removed by placing the parts in a solution of boiling water inside an ultrasound bath for 15 min.

Finally, a final heat treatment under a stream of argon was carried out at 980° C. for 4 hours, in order to obtain an NiAl-type coating of around 50 µm on the surface, as illustrated in FIG. 5 (cross-sectional view of a coating produced by deposition at 700° C. and annealing at 980° C. (thickness=50 µm)).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of", "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for depositing a corrosion-protection coating on a metallic substrate, the metallic substrate having at least one cavity having an equivalent diameter $e_{mm} < 2$ mm and a length/width ratio of greater than 150, comprising the step of:

depositing, on at least one portion of at least one of said at least one cavity, an aqueous suspension to form a substrate-suspension assembly, said aqueous suspension comprising powder of a metal to be deposited on said substrate, a protective agent for protecting surfaces of the metal powder, a diluent, an aqueous solvent, and at least one additive promoting wetting of said aqueous suspension on said substrate, wherein the particles of the suspension each have an equivalent diameter d such that $d \leq e_{mm}/10$ and the additive is at least one organic compound selected from the group consisting of binder, dispersant, complexing agent, wetting agent, and plasticizer, prior to said deposition, combining said metal powder, diluent, aqueous solvent, and at least one additive;

heating said substrate-suspension assembly to a temperature below 150° C. so as to eliminate said aqueous solvent;

following elimination of said aqueous solvent, maintaining said substrate-suspension assembly to a temperature between 400° C. and 500° C. for 1 to 10 hours under an inert gas or a reducing gas or under vacuum so as to eliminate said at least one organic compound to produce a coated substrate;

following said elimination of said at least one organic compound, performing a diffusion heat treatment of said metal toward said substrate by maintaining said coated substrate at a temperature between 500° C. and 700° C. for 1 to 10 hours under an inert gas or a reducing gas or under vacuum;

following said diffusion heat treatment, eliminating any residues of diluent from said coated substrate; and following said elimination of residues, maintaining said coated substrate at a temperature between 900 and 1100° C. for 1 to 5 hours, thereby producing a substrate whose cavities are coated with a corrosion-protection coating.

2. The process of claim 1, wherein said metal is aluminum.

3. The process of claim 1, wherein said aqueous suspension further comprises an activating agent.

4. The process of claim 1, wherein said aqueous suspension deposition is performed using a brush, roller, or spray gun, or by immersion of the substrate in the aqueous suspension.

5. The process of claim 1, further comprising the step of introducing dry air inside said at least one cavity.

6. The process of claim 1, wherein said elimination of residues is carried out by washing said coated substrate with an aqueous solution.

7. The process of claim 1, further comprising the sequential steps of, prior to said depositing, cleaning said substrate with at least one aqueous solution, subjecting said substrate to ultrasonic waves, and drying said substrate under a stream of dry air.

8. The process of claim 7, wherein said suspension further comprises an activating agent and said process further comprises pickling surfaces of the substrate to be coated prior to said cleaning.

9. The process of claim 7, wherein said aqueous suspension application is performed by: immersing said substrate in said aqueous suspension, injecting said aqueous suspension onto said substrate, or brush application of said aqueous suspension onto said substrate.

* * * * *